United States Patent [19]

Shirai et al.

[11] 4,289,216
[45] Sep. 15, 1981

[54] DISC BRAKE

[75] Inventors: Kenji Shirai; Hidetoshi Shimizu; Junichi Tanoue, all of Susono, Japan

[73] Assignee: Toyota Jidosha Kogyo Kabushiki, Toyota, Japan

[21] Appl. No.: 120,788

[22] Filed: Feb. 12, 1980

[30] Foreign Application Priority Data

Apr. 6, 1979 [JP] Japan .................................. 54-42355
Jun. 30, 1979 [JP] Japan .................................. 54-83263

[51] Int. Cl.³ .............................................. F16D 55/14
[52] U.S. Cl. ..................................... 188/72.2; 188/73.1; 188/218 XL
[58] Field of Search ................... 188/73.1, 73.3, 72.2, 188/72.4, 71.1, 218 XL, 72.7; 192/85 AA

[56] References Cited

U.S. PATENT DOCUMENTS

| | | | |
|---|---|---|---|
| 2,830,685 | 4/1958 | Humphrey | 192/85 AA |
| 3,835,962 | 9/1974 | Falk | 188/73.1 |
| 4,162,721 | 7/1979 | Moriya | 188/73.1 |

FOREIGN PATENT DOCUMENTS 1245806 9/1971 United Kingdom .............. 188/73.1

Primary Examiner—H. Grant Skaggs
Attorney, Agent, or Firm—Browdy and Neimark

[57] ABSTRACT

A disc brake free from dragging torque while being in non-braking state. In this brake, a gap between the friction surface of a rotary disc and the acting surface of an actuator for urging a braking pad assembly onto the disc is made progressively larger into a wedge shape toward the axis of the disc. The torque receiving surface of a torque receiving member is made so slant as to produce a component for moving the pad assembly in a direction away from the axis of the disc in a wedging manner into the gap. The pad assembly is of corresponding shape to the above-mentioned gap and the torque receiving surface. The pad assembly is moved in case of brake application in a direction away from the axis of the disc by virtue of the slantingly shaped torque receiving surface until it comes to abut on a stopper, and it is restored in case of brake releasing in a direction approaching the axis of the disc, due to the action of return springs, with a result of appearing of a preset brake clearance responding to the restoration of the pad assembly in the wedge shaped gap.

14 Claims, 11 Drawing Figures

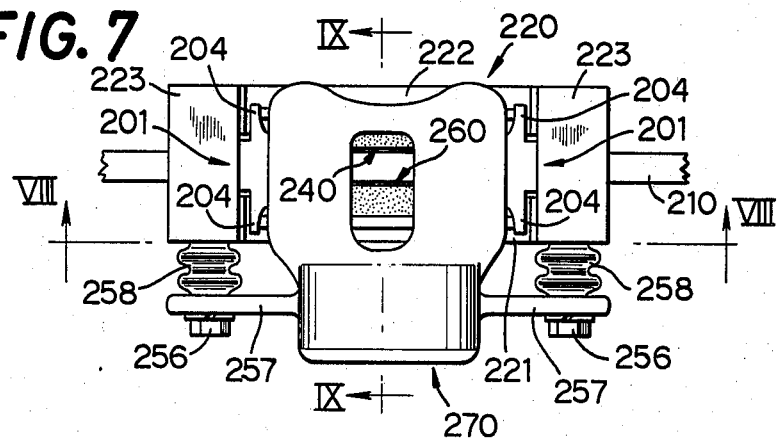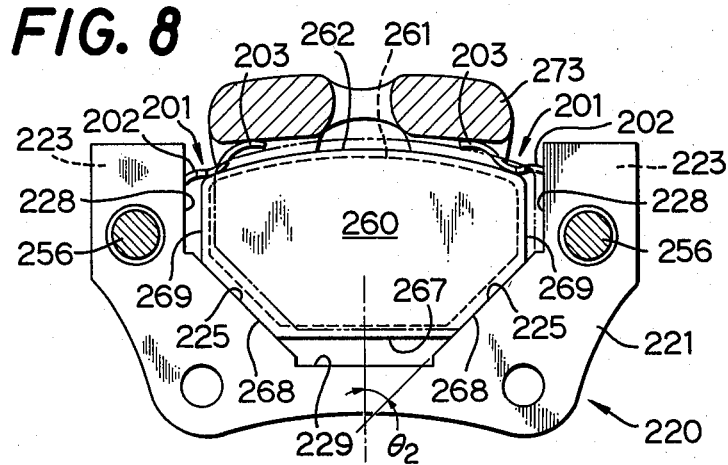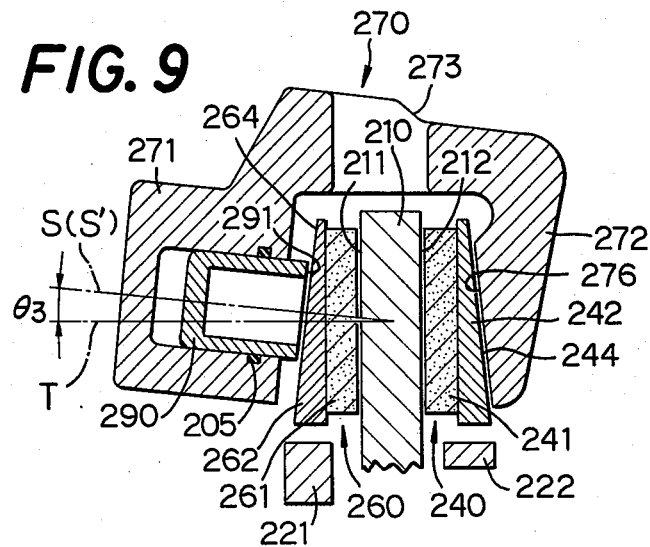

DISC BRAKE

FIELD OF THE INVENTION

This invention relates to a disc brake, and more particularly to the reduction of the dragging torque of a disc brake while being in non-braking state.

BACKGROUND OF THE INVENTION

A disc brake is a type of brake wherein a pair of braking pad assemblies are urged on both friction surfaces formed on a rotary disc to restrain the rotation of the disc, and it is widely used for cars of the like.

The disc brake is at present not free from a serious problem which is concerned with a great likelihood of giving rise to a so-called dragging phenomenon. That is, the braking pad assemblies which are urged onto the disc surfaces are liable to further remain thereon in the urged state at a certain amount of force, even after the brake has been released of its operation. When this dragging happens to force the disc to be rotated under the continuous dragging torque, the resultant energy loss will amount to an innegligible value. It is frequently said that the reduction of the dragging torque of this kind during the non-braking operation period is a key to the attainment of the fuel consumption economy in cars.

The dragging phenomenon often shortens life of the braking pad assemblies through increase of wearing, and further causes overheating of the brake system. The overheating decreases in turn the coefficient of friction of the braking pad assemblies, consequently deteriorates the braking effect, and sometimes leads to the vapor-lock, when the braking fluid is boiled by chance with a result of rendering the brake system incapable.

Irrespective of enormous efforts paid to the prevention of this dragging phenomenon, no decisive measures capable of eliminating the same have not been found.

This invention was made from such a background.

SUMMARY OF THE INVENTION

It is therefore a principal object of this invention to provide a disc brake capable of reducing the dragging torque during the non-braking operation period.

It is another object of this invention to prevent the residual dragging of the disc brake while attempting to reduce the amount of braking fluid used in braking.

It is still another object of this invention to realize a disc brake of small residual dragging in the non-braking operation time, of simple structure and of small manufacturing cost.

This invention is applicable to a disc brake which includes (a) a rotary disc having on either side thereof a friction surface, (b) a pair of braking pad assemblies each of which being provided with a pad member and a backing plate for supporting the former, which backing plate has a torque giving surface, (c) a torque receiving member fixedly positioned and provided with a torque receiving surface which is abuttable with the torque giving surface, and (d) an actuator provided with a pair of operational or acting surfaces respectively abuts on the backing plate of the pair of braking pad assemblies for urging the assemblies onto each of the disc surfaces. And the clearance or gap between the friction surface of the disc and the acting surface of the actuator is made progressively larger, in the design of this disc brake, towards the axis of the disc, and the torque giving surface of the braking pad assembly and the torque receiving surface of the torque receiving member are inclined or slant such that a component is produced which moves the braking pad assembly in a departing direction from the disc axis due to a torque which so acts, when the brake is applied, on the braking pad assembly as to accompany the same with the rotation of disc. The sphere of the movement of the braking pad assembly is regulated by a stopper means, and the braking pad assembly is, in the non-braking operation period, returned to and retained at the original position closest to the disc axis by means of a spring means.

The above-mentioned countermeasure is preferable to be taken on both sides of the disc, but it may be applied only on one side of the disc according to the circumstances. For example, in a disc brake employing a floating type caliper movable in the axial direction of the disc, wherein only on one side of the disc a hydraulic cylinder is disposed as an actuator and a reaction member is disposed on the other side, adoption of the above-mentioned countermeasure merely on the latter side, i.e., the reaction member side where the dragging is liable to occur oftener, will be effective in holding down the production cost and in greatly reducing the dragging torque.

For rendering the gap between the friction surface of the disc and the acting surface of the actuator progressively larger toward the disc axis, either of making the friction surface of the disc truncated conical concave or making the acting surface of the actuator slant so that it may be progressively distant from the friction surface of the disc as it nears the disc axis will do. In that case, the friction surface or the rear side surface of the braking pad assembly is required to be so shaped as to correspond to the friction surface of the disc or the acting surface of the actuator, as a matter of course.

In a disc brake of this invention, when the braking pad assembly which has been lightly urged onto the friction surface of the disc (disc rotor) by the action of the actuator during the initial stage of braking is forcibly rotated together with the rotating disc, the braking pad is moved in a departing direction from the disc axis by the action of the slant torque receiving surface of the torque receiving member, and it begins its substantial braking action there, being strongly urged without moving any longer onto the disc. Releasing of the brake will allow the braking pad assembly, when the urging force of the actuator has been almost nullified, to be restored to the original position nearer to the disc axis by the action of a spring means disposed at a suitable place. As the gap between the friction surface of the disc rotor and the acting surface of the actuator is being made larger on the nearer side to the disc axis, so the restoration of the braking pad assembly to the original position near the disc axis will surely leave a certain clearance between the braking pad assembly and the disc rotor or the actuator. The undesirable dragging in the non-braking operation time can thus be surely prevented in this way from taking place.

BRIEF DESCRIPTION OF THE DRAWINGS

FIG. 7 is a plan view of a fourth embodiment of a brake of this invention;

FIG. 8 is a cross-sectional view taken along the VIII—VIII line in FIG. 7;

FIG. 9 is a cross-sectional view taken along the IX—IX line in FIG. 7; and

DETAILED DESCRIPTION OF THE PREFERRED EMBODIMENTS

For clarifying the purpose, structure and effect of this invention preferable embodiments will be described with reference to the appended drawings.

Figure 1:
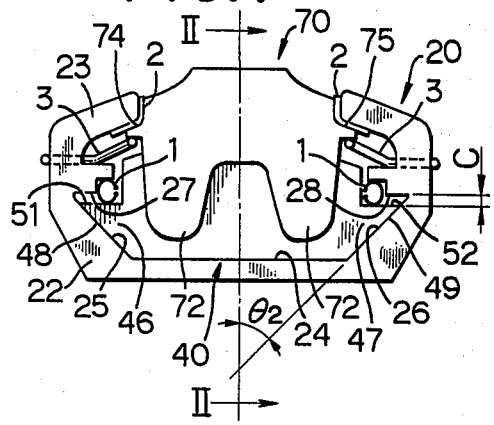
FIG. 1 is an elevational view of an embodiment of a disc brake in accordance with this invention.
Figure 2:
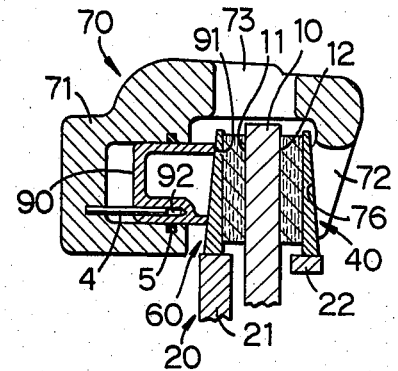
FIG. 2 is a cross-sectional view taken along the II—II line in FIG. 1.

A disc 10, in FIG. 1 and FIG. 2, is provided with, on either side at a portion near the periphery thereof, a friction surface 11, 12, and rotated with a wheel (not shown) about the axis. In the neighborhood of the disc 10 a torque receiving member 20 is disposed position-fixedly, which member is composed of a pair of flat plate portions 21, 22 parallelly disposed to the friction surface 11, 12 of the disc 10 on either side thereof and a connecting portion 25 which connects the flat plate portions 21, 22 crossing over the periphery of the disc 10, and is secured, with the flat plate portion 21, to a non-rotating member of the car such as a knuckle or a axle housing.

There is a large opening formed in the central part of the torque receiving member 20 extending from the flat plate portion 21, via the connecting portion 23, to the other flat plate portion 22. In this large opening an outer pad assembly 40, an inner pad assembly 60, and a caliper 70 are accommodated.

Figure 3:
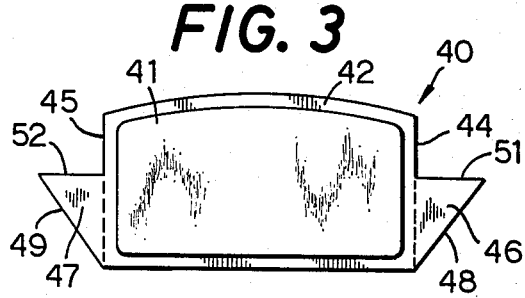
FIG. 3 is an elevational view of an outer pad employed in the disc brake shown in FIG. 1.
Figure 4:
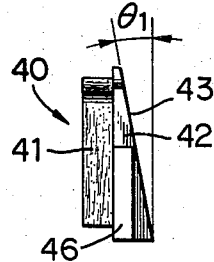
FIG. 4 is a side view of the outer pad shown in FIG. 3.

The outer pad assembly 40 consists of a pad member 41 and a backing plate 42 fixed to the same as shown in FIGS. 3 and 4. Although the pad member 41 is uniform in its thickness everywhere, the backing plate 42 is slant in its rear side surface 43, being progressively smaller in its thickness toward the upper portion thereof in FIG. 4 (farther portion from the disc axis at the attached state). And the slant angle $\theta_1$ of the rear side surface 43 may be as small as about 3° for attaining the purpose. On either lateral side 44, 45 of the backing plate 42 is protrudingly disposed a torque giving portion 46, 47, which is provided with a slant torque giving surface 48, 49, being progressively departed from each other as going upwards in FIG. 3.

A part of the opening in the torque receiving member 20 which is formed in a flat plate portion 22 is so shaped as to favorably accommodate the outer pad assembly 40, wherein the outer pad asssembly 40 is fitted in a manner contactable with as well as separable from the disc 10. The outer pad assembly 40 is biased by a pair of springs 1 toward the axis of the disc 10 to be usually stably rested in contact with a supporting surface 24 and a pair of torque receiving surfaces 25, 26 formed on the torque receiving member 20. In this state a clearance C is left between the upper surfaces 51, 52 of the torque giving portions 46, 47 of the outer pad assembly 40 and stopper surfaces 27, 28 formed on the torque receiving member 20.

The inner pad assembly 60 is similarly constructed as the outer pad assembly 40. It is mounted in the opening formed in the flat plate portion 21 of the torque receiving member 20 is an identical manner to the case of the inner pad assembly 40.

The caliper 70 is composed of a cylinder portion 71 disposed in confrontation with the rear side surface of the inner pad assembly 60, a reaction portion 72 disposed in confrontation with the rear side surface of the outer pad assembly 40 and a connecting portion 73 connecting the above two parts crossing over the periphery of the disc 10. And the caliper 70 is mounted, at the connecting portion 73 thereof, on the torque receiving member 20. In other words, on the edge of the opening formed in the torque receiving member 20 is attached a caliper guide 2, and the caliper 70 is rested, with sliding surfaces 74, 75 formed on the connecting portion 73 thereof, on the caliper guide 2 and elastically supported by a pair of springs 3 mounted on the torque receiving member 20.

In the cylinder portion 70 a piston 90 is fluid-tightly and slidably fitted. An acting surface 91 of the piston 90 is slant in corresponding to the inclination on the rear side surface of the inner pad assembly 60. And the piston 90 is prevented from rotation by a pin 4 so that the acting surface 91 thereof may be constantly maintained in parallel with the rear side surface of the inner pad assembly 60. The pin 4 is press-fitted, at one end thereof, in a fitting hole bored in the bottom wall of the cylinder portion 71 and fitted at the other end into a pin hole 92 bored in the piston 90. As the pin 4 is mounted in parallel with the axis of the cylinder portion 71, an axial movement of the piston 90 is allowed, but a rotation of the piston 90 is not allowed, because the pin 4 is disposed in an offset portion of the axis of the cylinder portion 71. Numeral 5 designates a seal ring.

The reaction portion 72 of the caliper 70 is biforked, as shown in FIG. 1, to be placed in confrontation with the rear side surface of the outer pad assembly 40, and the acting surface 76 thereof is slant in corresponding to the inclination of the rear side surface of the outer pad assembly 40.

When braking fluid is supplied to the cylinder portion 71 of the caliper 70, in a disc brake of the above-mentioned structure, the piston 90 is urged out of the cylinder to press the inner pad assembly 60 onto the friction surface 11 of the disc 10. The reactional force arising there moves the caliper 70 leftwardly (in FIG. 2), and the reaction portion 72 will consequently urge the outer pad assembly 40 onto the friction surface 12 of the disc 10.

When the outer pad assembly 40 is urged onto the friction surface 12 of the disc 10, the outer pad assembly 40 receives a torque, i.e., a so-called accompanying rotational torque. Assume the disc 10 is rotating clockwise in FIG. 1, then the outer pad assembly 40 is affected by a rotationary torque in the same direction, because the disc 10 tends to bring the outer pad assembly 40 together therewith due to the friction therebetween. The torque giving surface 49 is in consequence forcibly urged onto the torque receiving surface 26. The torque receiving surface 26 will in turn impart a reaction force to the torque giving surface 49, and this reaction force includes a component (hereafter called pad-pushing up force) which tends to move the torque giving portion 47 as a whole in a departing direction from the disc axis. And besides the outer pad assembly 40 is shaped such that the action line of the accompanying force (resultant of the frictional force acting on the whole of the pad member 41) acting on the outer pad assembly 40 may pass substantially the middle of the torque giving surface 49 in its longitudinal direction, therefore, the torque giving portion 47 will be moved right-upwardly in FIG. 1 at a state where the whole torque giving surface 49 is closely contacted with the torque receiving surface 26. It means the outer pad assembly 40 is moved as a whole in the direction away from the axis of the disc 10. At this time the outer pad assembly 40 is affected by an obstructing force which is the sum of the following elements: frictional force between the rear side surface 43 of the outer pad assembly 40 and the acting surface 76 of the reaction portion 72, frictional force between the torque giving surface 49 and the torque receiving surface 26, a component directed toward the disc axis of the urging force onto the rear side surface 43 of the outer pad assembly 40 given by the acting surface 76 of the reaction portion 72, spring force of the spring 1, and the dead weight of the outer pad assembly 40. And the slant angle $\theta_2$ of the torque receiving surface 26 is so selected as to get sufficient pad-pushing up force for moving the outer pad assembly 40 resisting the above-mentioned obstructing force.

The outer pad assembly 40 can be stopped at the most distant position from the axis of the disc 10, by means of abutting at the upper surfaces 51 and 52 of the torque giving portions 46 and 47 to the stopper surfaces 28 and 27 of the torque receiving member 20.

At this time the inner pad assembly 60 is, just in similar way as the outer pad assembly 40, moved to the most distant position from the axis of the disc 10. Both of the inner pad assembly 60 and the outer pad assembly 40 are therefore completely get out of the accompanying rotational movement caused by the rotation of the disc 10. And the braking action of this disc brake thereafter is carried out completely identically to that in the conventional disc brakes, according to the rising of the hydraulic pressure in the cylinder portion 71.

When the brake is released, the urging force by the caliper 70 is decreased in response to the falling of the braking fluid pressure in the cylinder portion 71, followed by restoration of the elasticity deformation such as compression deformation of the inner and outer pad assemblies 40, 60, expansion deformation of the caliper 70 (deformation by a mutual departing of the cylinder portion 71 and the reaction portion 72 from each other), etc., and pushing back of the piston 90 into the cylinder portion 71.

When the elastic deformation is almost completely restored, both of the inner pad assembly 60 and the outer pad assembly 40 are pushed back to the original position, i.e., to the nearest position to the axis of the disc 10 by the restoring force of the spring 1. And the gaps between the friction surfaces 11, 12 of the disc 10 and the acting surfaces 91, 76 of the piston 90 and reaction portion 72 are made progressively larger toward the axis of the disc 10, so that brake clearances in a preset amount will surely be maintained after the inner and outer pad assemblies 60, 40 are restored to the original position. The urging force on both pad assemblies are completely released.

As those brake clearances are filled up again at the next applying of the brake by the moving up of the both pad assemblies 60, 40 to the farthest position from the axis of the disc 10, the purposeful disposition of those brake clearances will never cause an increasing of the fluid amount consumed in the cylinder portion 71. On the contrary it contributes to decreasing the fluid amount consumed, in comparison to the conventional disc brakes, by that much corresponding to the decrease of shake-back or knock-back of the piston 90.

As clearly understood from the above description the braking pad assemblies 40, 60 have to move up-and-down resisting the frictional force in each contacting place, so the coefficient of friction in such places must be minimized for attaining the smooth operation of the brake system. For that purpose each contacting surface such as the torque giving surface 48, 49, the torque receiving surface 25, 26, the rear side surface of the outer pad assembly 40, the acting surface 76 of the reaction portion 72, the rear side surface of the inner pad assembly 60, the acting surface 91 of the piston 90, etc. should be diminished in its roughness and diminished in its coefficient of friction by means of, for example, applying a lining for friction reducing at least on one side of the contacting surfaces, etc. As the lining in this case, attaching a stainless steel plate to the contacting surface or applying a chromium plating on the same is effective, preventing the occurrence of rusting.

Figure 5:
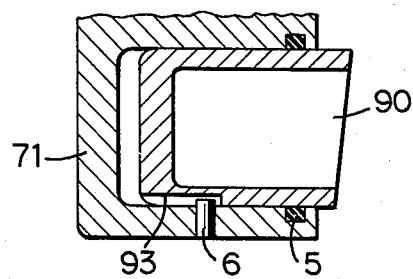
FIG. 5 is a partial cross-sectional view of a second embodiment of an actuator in a brake of this invention.

As a means for preventing the rotation of the piston 90, it is acceptable to form an axial groove 93, shown in FIG. 5, on the periphery of the piston 90 in the vicinity of its bottom portion, and to engage the projecting end of a pin 6 which is press-fitted in a through-bore formed in the side wall of the cylinder portion 71.

Figure 6:
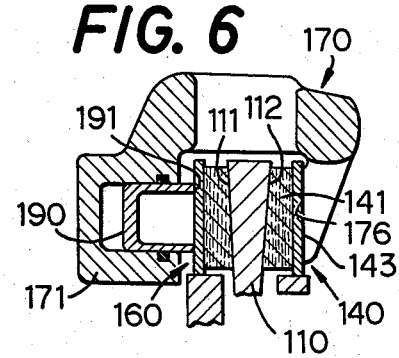
FIG. 6 is a partial cross-sectional view, corresponding to FIG. 2, of a third embodiment of a brake of this invention.

Another embodiment of this invention will be described with reference to FIG. 6. It is different from the previous embodiment in that the acting surface 191 of the piston 190 and the acting surface of the reaction portion 176 of the caliper 170 are both perpendicular planes to the axis of the disc 110, while the friction surfaces 111, 112 of the disc 110 are both slant to form a truncated conical concave surface, and therefore the required gaps are formed between the friction surfaces 111, 112 of the disc 110 and the neighboring members. The surface of the pad member 141 is made to be a part of a truncated conical convex surface for being correspondent to the shape of the friction surface 112 of the disc 110, leaving the rear side surface 143 of the outer pad assembly 140 to be, corresponding to the acting surface 176 of the reaction portion, a plane perpendicular to the disc axis. With the inner pad assembly 160 the situation is identical to that of the outer pad assembly 140. As to the other parts illustration and description are omitted, because the situation is just the same in the first embodiment.

The pad assemblies 140, 160 are also, in this embodiment, moved farther from the axis of the disc 110 when the brake is applied, and are restored to the original position nearer to the disc axis in response to the release of the brake, which prevents the brakes from giving rise to dragging during the nonbraking operation time.

In this embodiment there is no need of preventing the rotation of the piston 190. Further, this embodiment can be said more effective in the prevention of dragging, because the brake clearances are attempted to be made directly between the friction surfaces of the pad assemblies and the disc when the inner and outer pad assemblies 160, 140 are restored to the original position.

Another embodiment will be described next with reference to FIGS. 7-10. In FIGS. 7 through 9 numeral 210 designates a disc integrally rotated with a wheel (not shown), which disc is provided, on both sides thereof near the outer periphery, with friction surfaces 211, 212 perpendicular to the axis. A torque receiving member 220 is disposed position-fixedly in the neighborhood of the disc 210.

In the torque receiving member 220 a large opening is formed in the central portion thereof ranging from one flat plate portion 221, via a connecting portion 223, to the other flat plate portion 222, and in the opening an inner pad assembly 260, an outer pad assembly 240, and a caliper 270 are accommodated.

Figure 10:
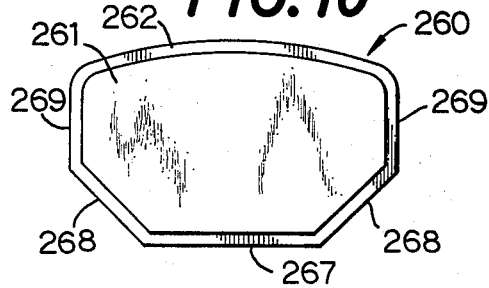
FIGS. 10 and 11 are respectively an elevational view and a side view of an inner pad employed in the brake shown in FIGS. 7-9.
Figure 11:
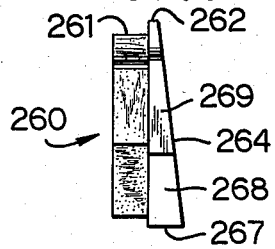

The inner pad assembly 260 is, as shown in FIG. 10 and FIG. 11, composed of a backing plate 262 which is of almost rectangular form with a cut-off portion of triangular shape in the left-lower and right-lower portion thereof, and a pad member 261 of similar form to the backing plate 262, fixedly attached to the former. As a result of this, the backing plate 262 has a pair of first torque giving surfaces 268 which are slant in a gradually diverging manner toward the periphery of the disc 210 and a pair of second torque giving surfaces 269 with no substantial inclination. The pad member 261 is uniform in its thickness, but the rear side surface 264 of the backing plate 262 is slant with a result that the backing plate 262 becomes thinner toward the periphery of the disc 210 (upwards in FIG. 11), with the tilt angle (angle of inclination) of 3°. So the inner pad assembly 260 is of wedge shape in its outline, and is fitted in a recess (a part of the above-mentioned opening) formed in the flat plate portion 221 of the torque receiving member 220, contactable with and separable from the disc 210. In other words, the flat plate portion 221 of the torque receiving member 220 is provided with a pair of torque receiving surfaces 225 so slant as to be progressively diverged toward the periphery of the disc 210 (upwards in FIG. 8) and a pair of the other torque receiving surfaces 228 with no substantial inclination. And the inner pad assembly 260 is, by the spring force of a pair of springs 201, closely contacted by its torque giving surfaces 268 to the torque receiving surfaces 225, while it is so positioned as to keep a clearance between the torque giving surfaces 269 and the torque receiving surfaces 228 as well as between the lower side 267 of the backing plate and the bottom surface 229 of the recess. The inner pad assembly 260 is slidable in a parallel direction to the axis of the disc 210.

The outer pad assembly 240 is of the identical structure to the inner pad assembly 260, and is accommodated and retained in the recess formed in the flat plate portion 222 of the torque receiving member 220 in the similar way to the inner pad assembly 260.

The caliper 270 is constituted of three major parts, i.e., the cylinder portion 271 disposed in confrontation to the rear side surface of the inner pad assembly 260, the reaction portion (pawl portion) 272 of biforked shape disposed in confrontation to the rear side surface of the outer pad assembly 240, and the connecting portion 273 to connect, crossing over the periphery of the disc 210, the above two portions. The caliper 270 is movably mounted on the torque receiving member 220 in the axial direction of the disc 210, being guided by a pair of slide pins 256 which are protected by boots 258, and guide holes (not shown) bored in the arms 257.

In the cylinder portion 271 of the caliper 270 the piston 290 is slidably fitted with a piston seal 205 as shown in FIG. 7. One thing which must be paid attention here is the fact that the axial line of the cylinder portion 271 and the piston 290 is not parallel to the axis of the disc 210. The bottom portion of the cylinder portion 271 of cylindrical form with a bottom is slightly higher than the opening portion thereof (lifted up a little toward the side of the periphery of the disc 210), that is to say, the cylinder portion 271 is slightly slant against the disc 210. The axis S of the cylinder portion 271 and a perpendicular line T (straight line parallel to the axis of the disc) to the friction surface 211 of the disc 210 form an angle $\theta_3$ of 3° therebetween. So the axis S' of the piston 290 slidably fitted into the cylinder portion 271 is also slant against the perpendicular line T by 3°. The tilt angle is equal to that of the rear side surface 264 of the backing plate 262. The acting surface 291 of the piston 290 is perpendicular to its axis S', so the piston 290 itself is by no means different from the ordinary pistons. The acting surface 276 of the reaction portion 272 of the caliper 270 is also slant by 3° from the perpendicular direction corresponding to the inclination of the rear side surface 244 of the backing plate 242 of the outer pad assembly 240.

The spring 201 is of cross form, being consisted of a foot portion 202, a head portion 203 and a pair of arms 204. The foot portion 202 and the head portion 203 are respectively engaged with the connecting portion 223 of the torque receiving member 220 and the connecting portion 273 of the caliper 270 from the side of disc axis. On the other hand, the arms 204 are engaged with shoulder portions, which are confronted to each other, of the pad assemblies 260 and 240, from the side of the periphery of the disc 210.

In a disc brake of such a construction, the braking pad assemblies 260, 240 urged onto the friction surface 211, 212 of the disc 210 tend to do the so-called accompanying rotation led by the disc 210. Assume that the disc 210 rotates in FIG. 8. clockwise, then the pad assemblies 260, 240 are affected by the same directional accompanying rotational torque. As the two pad assemblies are in the same situation, the description will be made only on the inner pad assembly 260.

When the inner pad assembly 260 comes under the accompanying rotational torque, the torque giving surface 268, right side in FIG. 8 and left side in FIG. 10, is urged against the torque receiving surface 225 of the flat plate portion 221. Then the torque receiving surface 225 imparts a reaction force to the torque giving surface 268, which includes a component tending to push up the inner pad assembly 260 toward the periphery of the disc 210 (upwards in FIG. 8), i.e., a force to push up the inner pad assembly 260. The inner pad assembly 260 is herewith moved by the above-mentioned torque toward right in FIG. 8, and in the meantime the same is, while abutting on the torque receiving surface 225 with only the torque giving surface 268 thereof, smoothly pushed up guided by the torque receiving surface 225 as illustrated in FIG. 8 with a two-dot-chain line.

When the inner pad assembly 260 has abutted, at the torque giving surface 269 thereof, on the torque receiving surface 228, it is thereby halted at the farthest position from the axis of the disc 210. The torque receiving surface 228 which is substantially not slant functions simultaneously as a stopper to block the inner pad assembly 260 from further moving beyond a certain limit toward the periphery of the disc 210. This moving direction is the one which gives rise to an wedge action between the rear side surface 264 of the backing plate 262 and the acting surface 291 of the piston 290, resulting in a strong urge of the pad member 261 of the inner pad assembly 260 onto the friction surface 211 of the disc 210.

Just similarly the outer pad assembly 240 is moved in a departing direction from the axis of the disc 210.

Both the inner pad assembly 260 and the outer pad assembly 240 are, after having been moved by a certain preset amount of distance, completely free from the accompanying rotation to the disc 210. The well known ordinary braking action then fully works thereafter in accordance with the rise of the hydraulic pressure in the cylinder portion 271.

When the brake is released, on the contrary, the urging force of the piston 290 is lowered in response to the falling of the hydraulic pressure for braking in the cylinder portion 271, following by a restoration of the compression deformation in the braking pad assemblies 260, 240 and an elasticity deformation of the caliper 270.

When the elasticity deformation has been almost restored, the inner pad assembly 260 and the outer pad assembly 240 are pushed back by the spring force of the springs 201 to the original position nearest to the axis of the disc 210. This movement causes a certain preset amount of clearances to be produced between the rear side surface 264 of the backing plate 261 of the inner pad assembly 260 and the acting surface 291 of the piston 290 as well as between the rear side surface 244 of the backing plate 242 of the outer pad assembly 240 and the acting surface 276 of the reaction portion 272. This will completely releave the urging force onto the braking pad assemblies 260, 240.

As in this embodiment the axis of the cylinder portion 271 is slant and the piston 290 itself is identical to the conventional ones, so there arises no problem from a rotation of the piston 290, requiring no means of prevention of rotation. And the cylinder portion 271 is by no means different in shape and structure from the conventional ones except for its being slightly slant in the axis thereof.

In all of the above-mentioned embodiments the torque giving surface on either lateral end of the pad assemblies and each of the torque receiving surfaces are made slant, so that the prevention of the dragging may be effective not only when the car is driven forwards but also when it is driven rearwards.

However, the dragging prevention effect is mainly required when the car is driven forwards, so it is also allowable to make only the torque giving surface and the torque receiving surface utilized for forward driving slant.

Furthermore, this invention is particularly effective in applying to a floating caliper type disc brake where the dragging is most liable to happen. But it is also applicable to a disc brake having a fixed caliper, as a matter of course.

What is claimed is:
1. In a disc brake including
a rotary disc having a friction surface on either side thereof near the periphery;
a pair of braking pad assemblies, each of which composed of a pad member and a backing plate for supporting the same, said backing plate being provided with a torque giving surface;
a torque receiving member disposed position-fixedly and provided with torque receiving surfaces abuttable with each of said torque giving surfaces; and
an actuator for urging said pair of braking pad assemblies onto said rotary disc with acting surfaces thereof respectively abuttable on the backing plate of said pair of braking pad assemblies, said disc brake comprising,
a gap between at least one of the friction surfaces of said rotary disc and the acting surface corresponding thereto of said actuator being made progressively larger into a wedge shape toward the axis of said rotary disc;
at least a part of said torque giving surface of the braking pad assembly and said torque receiving surface in confrontation to the same being so slant as to produce a component for moving said braking pad assembly, in the wedge shaped gap, in a direction away from the axis of said rotary disc caused by an accompanying rotational torque acting on said braking pad assembly in case of brake applying;
a stopper means for regulating the limit of the movement of said braking pad assembly; and
a spring means for biasing said braking pad assembly in a direction toward the axis of said rotary disc.

2. A disc brake claimed in claim 1, wherein the friction surface of said rotary disc is a plane perpendicular to the axis of said rotary disc, and the rear side surface of said backing plate and the acting surface of said actuator abuttable on the same are so slant as to become progressively distant from said friction surface as it nears the axis of said rotary disc.

3. A disc brake claimed in claim 2, wherein said actuator includes a cylinder and a piston fitted in said cylinder fluid-tightly and non rotatably but slidably in a parallel direction to the axis of said rotary disc, and an end surface of said piston is so slant as to be said acting surface.

4. A disc brake claimed in claim 3, wherein said piston is of cylindrical form and prevented from being rotated by engagement between a pin hole bored parallelly to the axis of said piston but at an eccentric position and a pin secured to said cylinder at a mated position with said pin hole.

5. A disc brake claimed in claim 3, wherein said piston is of cylindrical form provided with a parallel groove to the axis of said piston formed on the peripheral surface thereof, and said piston is prevented from being rotated by a pin, which is protruded from the inner surface of said cylinder and fitted into said groove.

6. A disc brake claimed in claim 2, wherein said actuator includes a cylinder and a piston which is fluid-tightly and slidably fitted into said cylinder, and an end surface of said piston is so slant as to become progressively distant from said friction surface as it nears the axis of said rotary disc because of the axis of said cylinder being so slant as to be perpendicular to the slant rear side surface of said backing plate.

7. A disc brake claimed in claim 2, wherein said actuator includes a caliper movably supported in a parallel direction to the axis of said rotary disc by said torque receiving member, and said caliper includes a hydraulic pressure cylinder provided with a piston abuttable on the rear side surface of one of said pair of braking pad assemblies and a reaction portion abuttable on the rear side surface of the other braking pad assembly, and a surface of said reaction portion which abuts on said the other braking pad assembly is so slant as to be said acting surface.

8. A disc brake claimed in claim 1, wherein the acting surface of said actuator are a perpendicular plane to the axis of said rotary disc and at least one of said friction surfaces of said rotary disc is made into a truncated conical concave so that the same may be progressively distant from said acting surface as it nears the axis of said rotary disc, and furthermore the surface of said pad member of said braking pad assembly is so formed as to be corresponding to the shape of said truncated conical concave friction surface.

9. A disc brake claimed in claim 1, wherein at least a part of said torque giving surface and said torque receiving surface are so slant at either lateral end of said braking pad assembly as to allow the braking pad assembly to progressively moving away from the axis of said rotary disc, when the brake is applied, irrespective of the rotating direction, either positive or negative, of said rotary disc.

10. A disc brake claimed in claim 1, wherein said spring is of cross form provided with a head portion, a foot portion, and a pair of arms, and engaged respectively at the head portion and the foot portion with a part of said actuator and a part of said torque receiving member from the side of disc axis, and further engaged at the pair of arms with the mutually confronting portions of said pair of braking pad assemblies from the side of the periphery of said disc rotor.

11. A disc brake claimed in claim 1, wherein said torque giving surface and said torque receiving surface are wholely slant, and the surface of said braking pad assembly on the side of the periphery of said rotary disc is confronted, with a certain preset clearance, to the surface of said torque receiving member on the side of the disc axis, and said two surfaces function as said stopper means by being abutted to each other when said braking pad assembly has been moved.

12. A disc brake claimed in claim 1, wherein said torque giving surface and said torque receiving surface are partially slant at a nearer place to the disc axis, and not slanted parts of said torque giving surface and said torque receiving surface are confronted to each other with a certain preset clearance therebetween, and said not slanted parts are abutted to each other, when said braking pad assembly is moved, for functioning as said stopper means.

13. A disc brake claimed in claim 1, wherein at least one of said torque giving surface and said torque receiving surface is applied lining for friction reducing.

14. A disc brake claimed in claim 1, wherein at least one of the rear side surface of said braking pad assembly and the acting surface of said actuator is applied lining for friction reducing.

* * * * *